United States Patent
Hirth et al.

(10) Patent No.: US 8,335,316 B2
(45) Date of Patent: Dec. 18, 2012

(54) METHOD AND APPARATUS FOR DATA PRIVACY IN PASSIVE OPTICAL NETWORKS

(75) Inventors: Ryan E Hirth, Windsor, CA (US);
Edward W Boyd, Petaluma, CA (US);
Ngo Thanh Ho, Arlington, TX (US)

(73) Assignee: Broadcom Corporation, Irvine, CA (US)

( * ) Notice: Subject to any disclaimer, the term of this patent is extended or adjusted under 35 U.S.C. 154(b) by 829 days.

(21) Appl. No.: 12/414,963

(22) Filed: Mar. 31, 2009

(65) Prior Publication Data

US 2009/0262937 A1    Oct. 22, 2009

Related U.S. Application Data

(60) Provisional application No. 61/046,654, filed on Apr. 21, 2008.

(51) Int. Cl.
*H04K 1/00* (2006.01)
(52) U.S. Cl. .................................................. 380/256
(58) Field of Classification Search .......... 380/221, 380/244, 255–256, 259–261, 274; 713/150, 713/160, 400; 709/230, 231, 236, 248
See application file for complete search history.

(56) References Cited

U.S. PATENT DOCUMENTS

| | | | |
|---|---|---|---|
| 4,654,480 A * | 3/1987 | Weiss | 713/181 |
| 5,060,266 A * | 10/1991 | Dent | 380/274 |
| 6,870,836 B1 | 3/2005 | Dyke et al. | |
| 7,349,537 B2 * | 3/2008 | Kramer et al. | 380/28 |
| 7,720,072 B2 * | 5/2010 | Tan et al. | 370/395.21 |
| 2002/0044651 A1 * | 4/2002 | Tuvell | 380/37 |
| 2004/0028409 A1 | 2/2004 | Kim | |
| 2004/0073788 A1 | 4/2004 | Kim | |
| 2004/0095884 A1 * | 5/2004 | Lee et al. | 370/235 |
| 2004/0136534 A1 | 7/2004 | Stiscia et al. | |
| 2004/0136712 A1 | 7/2004 | Stiscia | |
| 2004/0196862 A1 | 10/2004 | Song et al. | |
| 2005/0008158 A1 | 1/2005 | Huh et al. | |
| 2005/0047602 A1 | 3/2005 | Lee et al. | |
| 2005/0201554 A1 * | 9/2005 | Kramer et al. | 380/28 |
| 2006/0136715 A1 | 6/2006 | Han | |
| 2007/0076885 A1 * | 4/2007 | Sood et al. | 380/270 |
| 2007/0133791 A1 | 6/2007 | Han | |
| 2008/0062984 A1 * | 3/2008 | Emeott et al. | 370/392 |
| 2008/0162929 A1 * | 7/2008 | Ishikawa et al. | 713/160 |
| 2008/0310368 A1 * | 12/2008 | Fischer | 370/331 |
| 2009/0119509 A1 * | 5/2009 | Cho et al. | 713/171 |
| 2010/0034189 A1 * | 2/2010 | Ranta | 370/350 |

* cited by examiner

*Primary Examiner* — Philip Chea
*Assistant Examiner* — Eric W Shepperd
(74) *Attorney, Agent, or Firm* — Sterne, Kessler, Goldstein & Fox P.L.L.C.

(57) ABSTRACT

One embodiment provides a system for decrypting data frames in an Ethernet passive optical network (EPON). During operation, the system maintains a local cipher counter at a local node, and receives from a remote node a data frame which is encrypted based on a remote input block and a session key. The remote input block is constructed based on the remote cipher counter and a remote block counter. The system updates the local cipher counter based on a received field located in a preamble of the data frame, truncates the local cipher counter by discarding a number of least significant bits, and constructs for the received data frame a local input block based on the truncated local cipher counter, the received field, and a local block counter. The system then decrypts the data frame based on the local input block and the session key.

27 Claims, 13 Drawing Sheets

EPON FRAME PREAMBLE 500

EPON FRAME PREAMBLE 500

LOCAL PN COUNTER 600

| | |
|---|---|
| DA = 01-80-C2-00-00-02 | 6 |
| SA | 6 |
| Length/type = 88-89 | 2 |
| Subtype = 0x03 | 1 |
| flags | 2 |
| Code = 0xEE | 1 |
| OUI = FF-FF-FF | 3 |
| message_type | 1 |
| options | 2 |
| cipher_counter | 2 |
| switch_counter | 6 |
| [key] | 16 |
| pad | 12 |
| FCS | 4 |

FIG. 12

METHOD AND APPARATUS FOR DATA PRIVACY IN PASSIVE OPTICAL NETWORKS

RELATED APPLICATION

This application claims the benefit of U.S. Provisional Application No. 61/046,654, entitled "METHOD AND APPARATUS FOR DATA PRIVACY IN PASSIVE OPTICAL NETWORKS," by inventor Ryan E. Hirth, filed 21 Apr. 2008.

BACKGROUND

1. Field

This disclosure is generally related to the design of passive optical networks. More specifically, this disclosure is related to a method and an apparatus for data privacy in passive optical networks.

2. Related Art

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering large bandwidth to end users.

Among different competing technologies, passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multi-point network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1). Note that other topologies, such as ring and mesh topologies, are also possible.

Transmissions within a PON are typically performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. The ONU can reside in the residence of the customer and couples to the customer's own home network through customer-premises equipment (CPE).

In the example of an Ethernet PON (EPON), communications can include downstream traffic and upstream traffic. In the following description, "downstream" refers to the direction from an OLT to one or more ONUs, and "upstream" refers to the direction from an ONU to the OLT. In the downstream direction, because of the broadcast nature of the 1xN passive optical coupler, data packets are broadcast by the OLT to all ONUs and are selectively extracted by their destination ONUs. Moreover, each ONU is assigned one or more Logical Link Identifiers (LLIDs), and a data packet transmitted by the OLT typically specifies an LLID of the destination ONU. In the upstream direction, the ONUs need to share channel capacity and resources, because there is only one link coupling the passive optical coupler to the OLT.

FIG. 1 illustrates a passive optical network including a central office and a number of customers coupled through optical fibers and a passive optical splitter (prior art). A passive optical splitter 102 and optical fibers couple the customers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs) and wavelength division multiplexing (WDM) PONs.

One challenge in designing an EPON is to improve an EPON's security. Security concerns in an EPON arise because an EPON typically serves non-cooperative, private users through a broadcasting downstream channel. This channel can potentially become available to any interested party capable of operating an end station in a promiscuous mode. In general, to ensure EPON security, a network operator needs to guarantee subscriber privacy. Hence, mechanisms to control subscribers' access to the infrastructure are critical. Unfortunately, conventional encryption methods are not the best choice because they often involve modifications to the underlying communication protocols or add a considerable overhead to the transmitted data frames. Modifications of the underlying protocols can potentially interfere with other extensions and development of these protocols, and data frame overhead consumes precious communication bandwidth.

Hence, what is needed is a method for encrypting and decrypting data in an EPON without interference with future extensions of existing protocols and with minimal overhead.

SUMMARY

One embodiment provides a system for decrypting data frames in an Ethernet passive optical network (EPON). During operation, the system maintains a local cipher counter at a local node, and receives from a remote node a data frame which is encrypted based on a remote input block and a session key. The remote input block is constructed based on the remote cipher counter and a remote block counter. The system updates the local cipher counter based on a received field located in a preamble of the data frame, truncates the local cipher counter by discarding a number of least significant bits, and constructs for the received data frame a local input block based on the truncated local cipher counter, the received field, and a local block counter. The system then decrypts the data frame based on the local input block and the session key.

In a variation on this embodiment, the remote cipher counter includes a remote packet number (PN) counter.

In a further variation, the received field includes n least significant bits of the remote PN counter.

In a further variation, the local cipher counter includes a local PN counter, and the local cipher counter is truncated by discarding n least significant bits.

In a further variation, the system updates the local cipher counter based on the difference between the remote PN and the local PN.

In a further variation, the system updates the local cipher counter by incrementing the truncated local cipher counter if the value of the remote PN minus that of the local PN is less than 1.

In a variation on this embodiment, the remote cipher counter includes a multi-point control protocol (MPCP) counter.

In a further variation, the received field includes bit i to bit j of the remote MPCP counter.

In a further variation, the local cipher counter includes a local MPCP counter, and the local cipher counter is truncated by discarding j least significant bits.

In a further variation, the system updates the local cipher counter if the most significant bit of the received field and bit j of the local MPCP counter are different. If the decimal value of the least significant j bits of the untruncated local cipher counter is greater than or equal to $2^{(j-1)}$, the system adjusts the local cipher counter by incrementing the bit j of the local cipher counter by one and performing necessary carry-overs. Otherwise, the system adjusts the local cipher counter by decrementing the bit j of the local cipher counter by one and performing necessary carry-overs.

In a further variation, i equals 2 and j equals 5.

In a variation on this embodiment, the construction of the local input block involves concatenating the truncated local cipher counter, at least part of the received field, and the local block counter.

In a variation on this embodiment, the system decrypts the received data frames by encrypting the constructed local input block with the session key based on the Advanced Encryption Standard (AES) to obtain a local output block, and performing an exclusive OR (XOR) operation on a 128-bit block, which corresponds to the block counter, within the received data frame and the local output block to obtain a 128-bit block of unencrypted data.

BRIEF DESCRIPTION OF THE FIGURES

FIG. 12 presents a diagram illustrating an exemplary format of a key exchange message in accordance with one embodiment of the present invention.

Table 1 illustrates a pseudo code for adjusting the local cipher counter based on the MSB of the received MPCP-LB field in accordance with an embodiment of the present invention In the figures, like reference numerals refer to the same figure elements.

DETAILED DESCRIPTION

Figure 1:
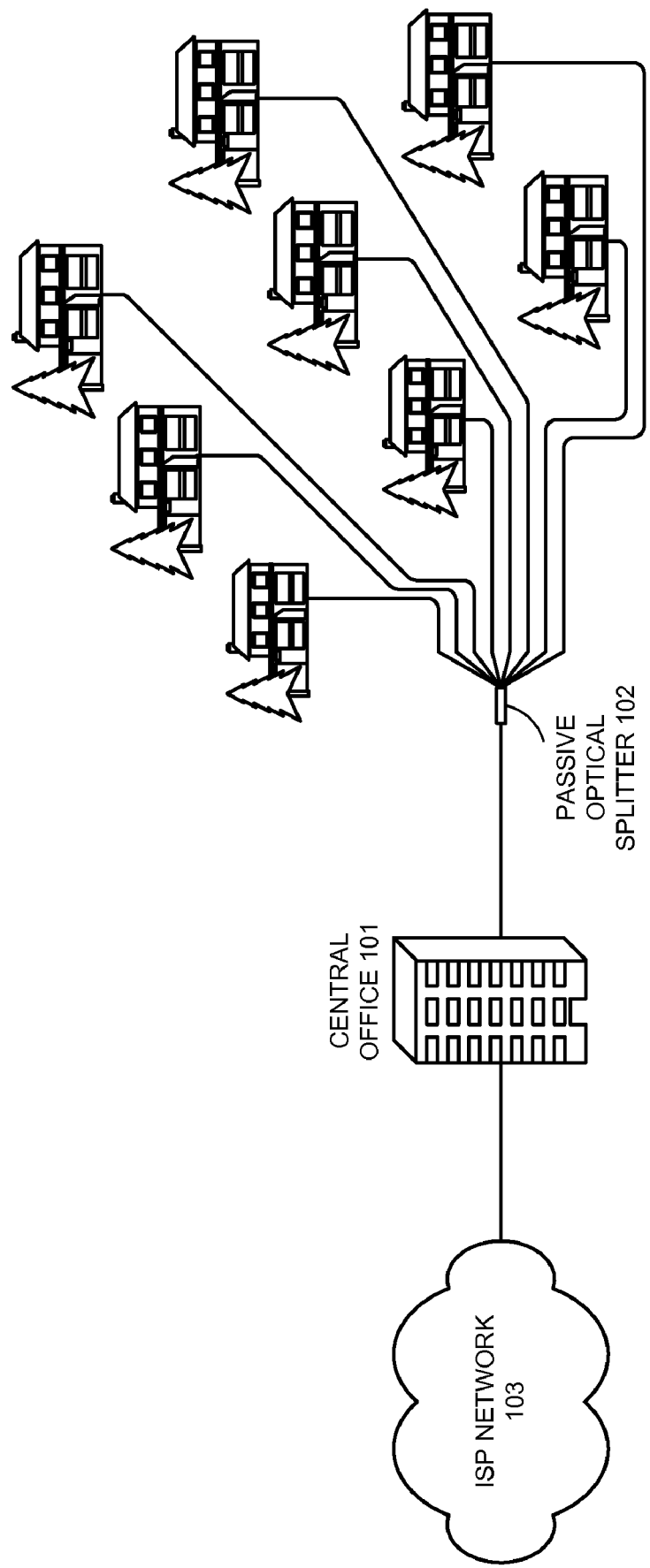
FIG. 1 presents a diagram illustrating a PON wherein a central office and a number of customers are coupled through optical fibers and a passive optical splitter (prior art).

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a solution for data encryption in an EPON. The EPON data encryption scheme encrypts a data frame using 128-ASE in the counter mode. To construct a unique, non-repeating cipher input block that can be properly shared by the OLT and the ONU, and to ensure zero overhead is added to the transmitted data frame, in embodiments of the present invention, a portion of a counter at the transmitting station is sent along with the data frame as part of the frame preamble. In one embodiment, both the OLT and the ONU keep a packet number (PN) counter, and during transmission, lower bits of the local PN counter are sent with the data frame in the frame preamble. In another embodiment, a chunk of lower bits from a multi-point control protocol (MPCP) counter are sent as part of the frame preamble, and the cipher input block is constructed based a truncated local MPCP counter and the bits in the preamble.

EPON Security

As previously mentioned, because every data frame sent from an OLT is broadcast to all ONUs, the potential security risk associated with the EPON architecture can be high. In an EPON, eavesdropping is possible by operating an ONU in promiscuous mode, wherein the ONU listens to traffic intended for other ONUs. Although EPON's point-to-point emulation uses logic link identifiers (LLIDs) to allow different ONUs to filter frames, an ONU might disable this filtering mechanism and monitor all the traffic.

Compared with downstream traffic, the upstream traffic is relatively more secure. Typically, upstream traffic is visible only to the OLT, because of the directivity of a passive combiner. However, reflections might still occur in the passive combiner. The passive combiner may send some small fraction of the upstream signals in the downstream direction. In general, this downstream reflection does not pose a huge security threat, because an ONU's receiver is typically tuned to receive downstream transmission which is on a different wavelength than the upstream transmission. Hence, it is more difficult for an ONU to receive the reflected upstream signals from other ONUs.

Yet, the upstream traffic can still be intercepted at the optical splitter/combiner, if the optical splitter/combiner is a symmetrical device (e.g., a star coupler). In this case, any upstream traffic is reflected to a number of ports at the splitter/combiner. A special receiver sensitive to the upstream wavelength can be coupled to one of the unused ports at the splitter/combiner to intercept all upstream traffic.

To reduce the aforementioned security risks, it is desirable to perform data encryption within an EPON. In particular, encryption of downstream transmission prevents eavesdropping when the encryption key is not shared. Downstream encryption can provide privacy to subscriber data and can make impersonation of another ONU difficult. Additionally, upstream encryption prevents interception of upstream traffic when a tap is added to the EPON splitter/combiner. Upstream encryption can also prevent impersonation, because an ONU generating an upstream frame is expected to possess a key presumably known only to that ONU.

Encryption Mechanism

One approach to facilitate data encryption in an EPON is based on the Advanced Encryption Standard (AES), which allows one to use 128-bit, 192-bit, or 256-bit keys. The National Institute of Standard and Technology (NIST) provides methods of operations for AES that include modes like Cipher Feedback (CFB) and Counter Mode (CM). According to IEEE standard 802.1ae, which defines a media access control security (MACsec) protocol, the default cipher suite uses the Galois/Counter Mode (GCM) of operation with the AES-128 symmetric block cipher. Note that GCM combines the counter mode (CM) of encryption and the Galois mode of authentication. The instant disclosure discusses the encryption aspect of EPON security.

Figure 2A:
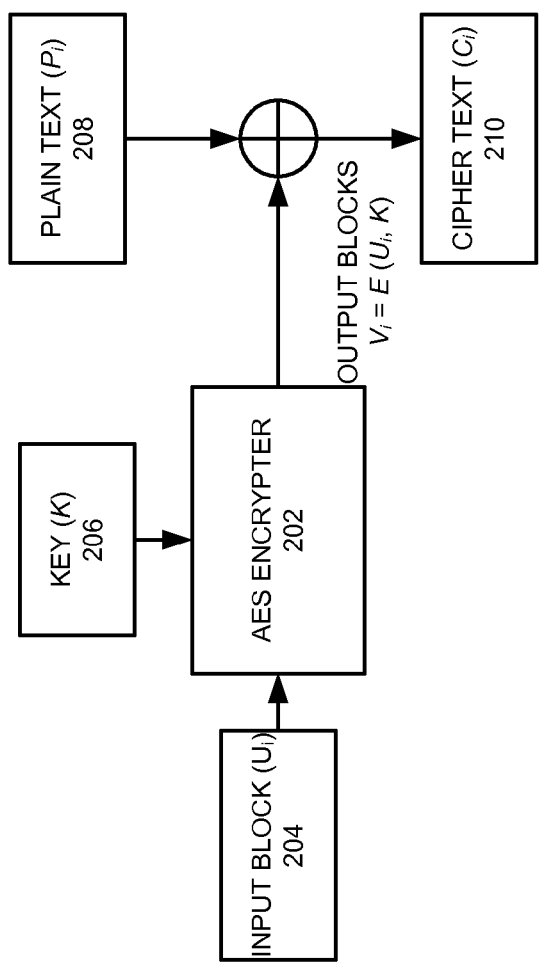
FIG. 2A present a diagram illustrating an encryption scheme for EPON data frames in accordance with an embodiment of the present invention.

FIG. 2A illustrates an encryption scheme for EPON data frames based on a CM-AES-128 cipher in accordance with an embodiment of the present invention. In this example, the incoming plain text (i.e., unencrypted data) is divided into 128-bit blocks and each block is encrypted individually. During operation, an AES encrypter 202 performs an encryption function on a 128-bit input block ($U_i$) 204, which is based on the output of a counter, and a session key (K) 206 according to AES standards. The encryption function then produces a 128-bit output block $V_i=E(U_i, K)$. The output block $V_i$ is subsequently exclusively ORed (XORed, represented by the ⊕ sign) with a 128-bit block of plain text ($P_i$) 208 to produce a 128-bit block of cipher text ($C_i$) 210.

Note that in FIG. 2A, the system generates a different input block $U_i$ for each plain text block $P_i$. The key K, on the other hand, does not expire until the end of a session. Furthermore, since a message does not necessarily carry an integer number of 128-bit blocks, the last plain text block (1 to 16 bytes in length) within a data frame is XORed with the most significant portion of the last output block. This approach does not require padding of the plain-text messages and provides an encryption function without overhead. The following representations describe the CM encryption:

$$V_i = E(K, U_i) \text{ for } i=1, \ldots, k \tag{1}$$

$$C_i = P_i \oplus V_i \tag{2}$$

where $P_i$ is the ith plain-text block, $C_i$ is the ith cipher-text block, K is the session key, $V_i$ is the ith cipher output block, and $U_i$ is a series of input 128-bit values which are used only once during the lifetime of the given session key.

Figure 2B:
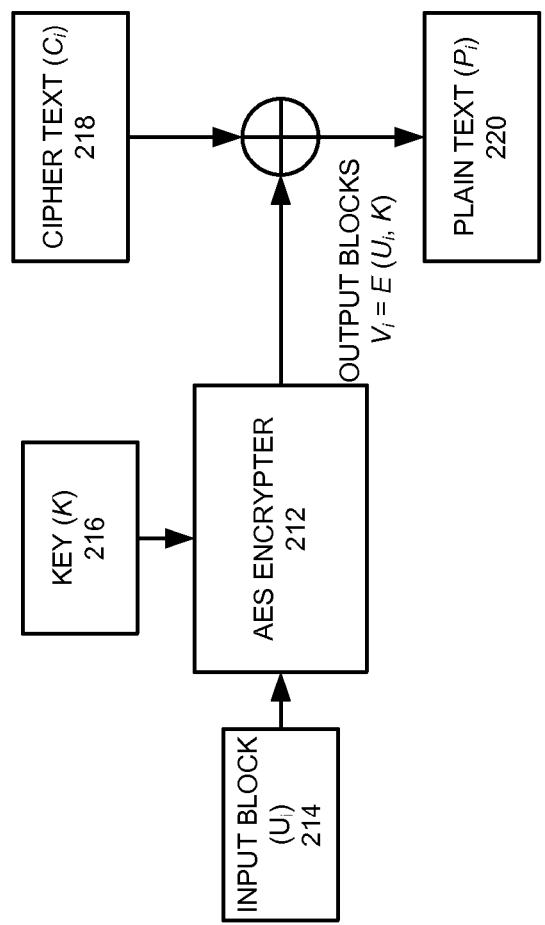
FIG. 2B presents a diagram illustrating a decryption scheme for EPON data frames in accordance with an embodiment of the present invention.

FIG. 2B illustrates a decryption scheme for EPON data frames based on a CM-AES-128 cipher in accordance with an embodiment of the present invention. To decrypt a message, the incoming cipher text (i.e., the encrypted data) is divided into 128-bit blocks and each block is decrypted individually. During operation, an AES encrypter 212 performs an encryption function on a 128-bit input block ($U_i$) 214, which is based on the output of a counter, and a session key (K) 216. The encryption function then produces a 128-bit output block $V_i=E(U_i, K)$. The output block $V_i$ is subsequently XORed with a 128-bit block of cipher text ($C_i$) 218 to produce a 128-bit block of plain text ($P_i$) 220. Note that to correctly decrypt the cipher text, the receiving/decrypting side ideally uses the same counter sequence and session key as the transmitting/encrypting side.

Packet Number Cipher Counter

Figures 3A, 3B:
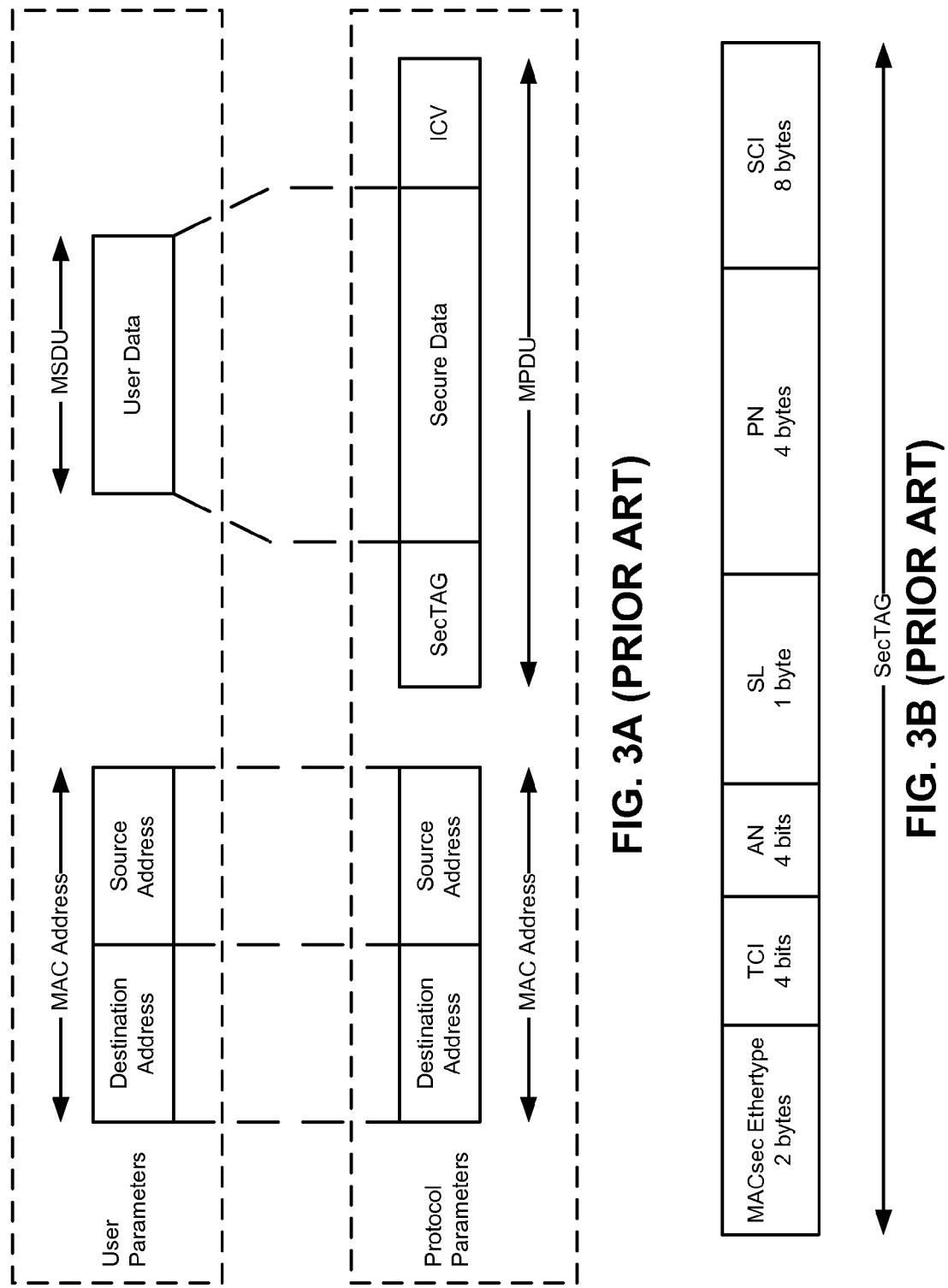
FIG. 3A presents a diagram illustrating an exemplary data frame according to MACsec protocol (prior art).
FIG. 3B presents a diagram illustrating the fields of the SecTAG header according to MACsec protocol (prior art).

In the CM encryption scheme, a non-repeating 128-bit cipher input block value is associated with each 128-bit block of text. These cipher input block values are often constructed based on some kind of a counter. The MACsec protocol (as defined in IEEE standard 802.1e) constructs a cipher input block based on a 32-bit packet number (PN). To guarantee that the receiving station can correctly reconstruct an identical cipher input block for data decryption, MACsec specifies that the 32-bit PN is included in the encrypted data frame. FIG. 3A presents a diagram illustrating the MACsec frame format in comparison with the un-encrypted data frame format (prior art). Note that in FIG. 3A, the Destination Address and Source Address parameters are shown as separate from the MAC Service Data Unit (MSDU), as they are separate parameters of each service request. FIG. 3A illustrates that, in addition to the secure data, MACsec Protocol Data Unit (MPDU) includes a MACsec security tag (SecTag) and an integrity check value (ICV).

FIG. 3B presents a diagram illustrating the format of the SecTag (prior art). The SecTag includes a two-byte MACsec Ethertype field, a four-bit tag control information (TCI) field, a four-bit association number (AN) field, a one-byte short length (SL) field, a four-byte packet number (PN) field, and an eight-bytes optionally encoded secure channel identifier (SCI) field. As one can see, the total length of SecTag is 16 bytes, which can be a considerable overhead to the original Ethernet frame, especially if the original frame is short.

To provide a zero overhead EPON encryption solution, an embodiment of the present invention relies on maintaining PN counters at both the transmitting and receiving stations. By synchronizing those PN counters, the receiving station can correctly reconstruct the cipher input block using its local PN counter. The PN counter at the transmitting station increments by one each time a packet is transmitted, and the PN counter at the receiving station increments by one each time a packet is received. Ideally, these two counters synchronize with each other if they both start counting from a same initial number. However, due to packet loss during transmission, these two PN counters can easily lose synchronization. Therefore, it is important to provide a synchronization method that can tolerate packet loss. In an embodiment, a portion or all of the PN is transmitted along with the data frame, and to avoid additional frame overhead, the PN is embedded inside the data frame preamble.

Figure 4:
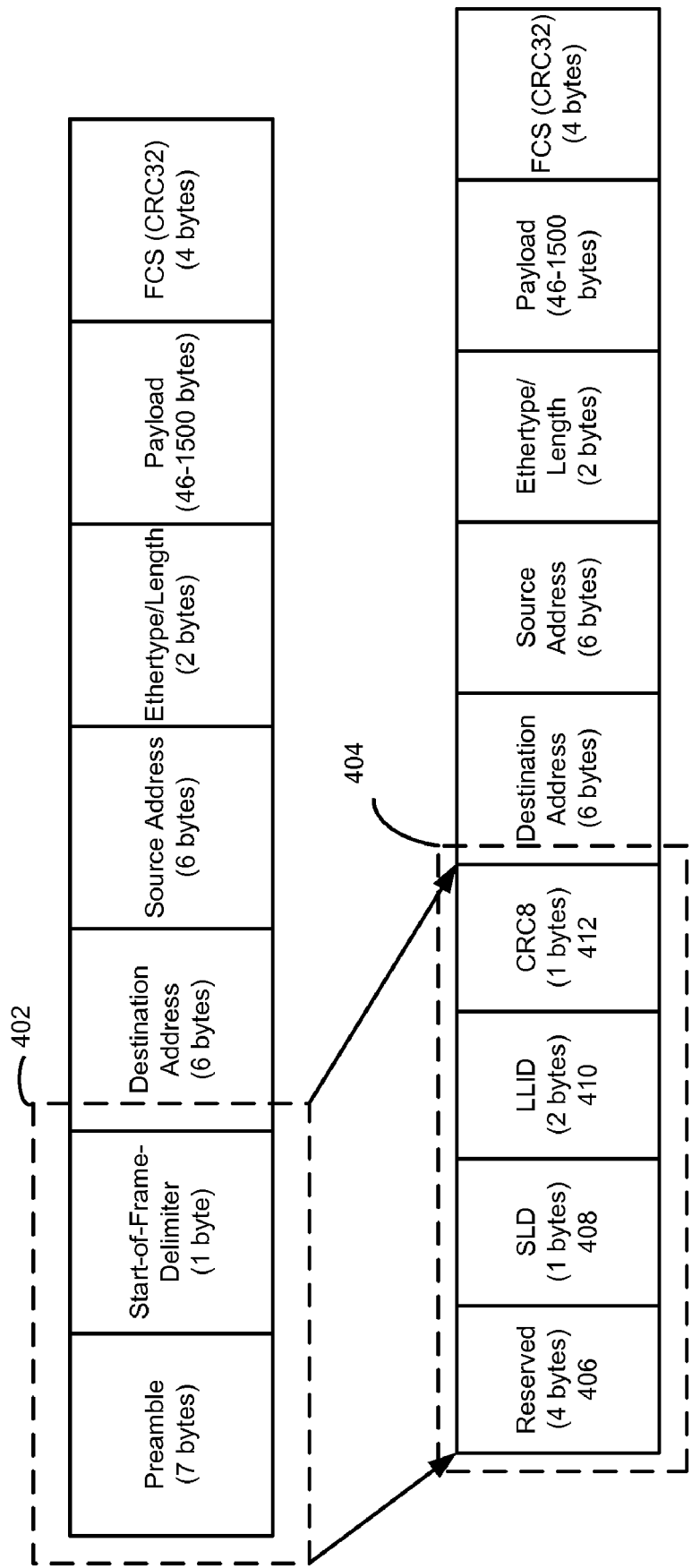
FIG. 4 presents a diagram illustrating the format of an Ethernet data frame and an EPON data frame (prior art).

FIG. 4 presents a diagram illustrating a conventional Ethernet frame and an EPON frame (prior art). A conventional Ethernet frame includes an Ethernet frame preamble 402, which includes seven bytes of preamble and one byte of start-of-frame delimiter (SFD). Ethernet frame preamble 402 is used to assure proper clock recovery process and data stream alignment. When used in an EPON, Ethernet frame preamble 402 is modified to become EPON frame preamble 404, which includes a four-byte reserved field 406, a one-byte start-of-logical-link identifier (LLID) delimiter (SLD) field 408, a two-byte LLID field 410, and a one-byte cyclic-redundancy check (CRC8) field 412. The rest of the EPON frame is identical to that of the conventional Ethernet frame. Note that reserved field 406 in EPON frame preamble 404 is not used within the PON context, and is reserved for future protocol extension.

Figure 5:
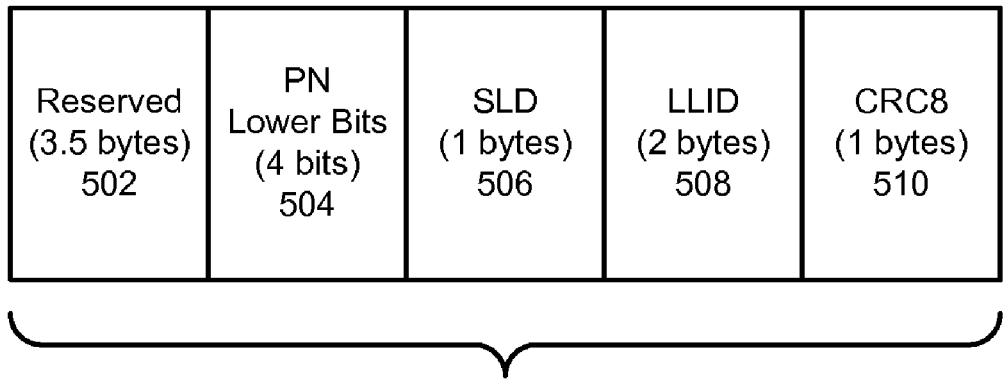
FIG. 5 presents a diagram illustrating a modified EPON frame preamble facilitating data frame encryption in accordance with an embodiment of the present invention.

FIG. 5 presents a diagram illustrating a modified EPON frame preamble facilitating data frame encryption in accordance with an embodiment of the present invention. In FIG. 5, EPON frame preamble 500 includes a three-and-half-byte reserved field 502, a four-bit PN lower bits (PNLB) field 504, a one-byte SLD field 506, a two-byte LLID field 508, and a one-byte CRC8 field 510. Four-bit long PNLB field 504 carries the four least significant bits (LSBs) of the PN. Note that PNLB field 504 can be longer than four bits, thus capable of transferring more than four LSBs of the PN. In one embodiment, PNLB field 504 is one-byte long carrying eight LSBs of the PN. However, using longer bits in the EPON preamble for security can hinder future protocol development that may rely on remaining reserved bits.

Figure 6:
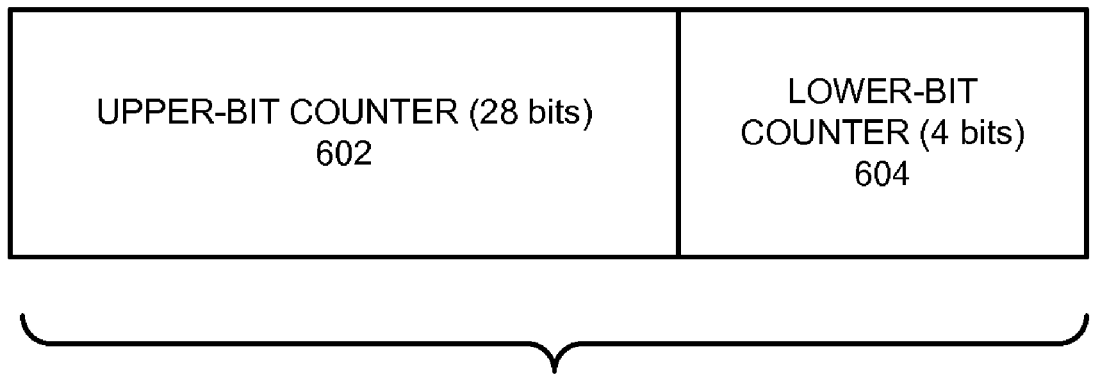
FIG. 6 presents a diagram illustrating a PN counter maintained on a receiving station in accordance with an embodiment of the present invention.

FIG. 6 presents a diagram illustrating a PN counter maintained on a receiving station in accordance with an embodiment of the present invention. 32-bit local PN counter 600 includes two parts: a 28-bit upper-bit counter 602 and a 4-bit lower-bit counter 604. The content of lower-bit counter 604 is obtained from the received EPON frame preamble, whereas the content of upper-bit counter 602 is inferred. To make sure that the local upper-bit counter 602 is identical to that of a remote PN counter, both PN counters start their initial count at a known value such as zero. In one embodiment, upper-bit counter 602 increments when there is a carry-over from lower-bit counter 604.

The data channel in which packets are transferred is subject to bit errors and possibilities of corrupted data. Such errors and corrupted data can be effectively detected by CRC8 field 510 and the frame check sequence (FCS) field at the end of the EPON frame. To provide the receiving station with a PN that is synchronized with the transmitting station, PNLB field 504 in the preamble needs be tolerant of lost and corrupt count values. The number of lost packets that can be tolerated by this scheme is proportional to the length of PNLB field 504. For example, a system with a 4-bit (16 values) long PNLB field can tolerate up to 15 consecutive packet losses. If there are more than 15 packet losses in a row, then the receiving station PN counter will lose synchronization with the transmitting station PN counter. As a result, the link will be forced to restart the encryption process, during which a new session key is generated and both PN counters are reset to zero.

Figure 7:
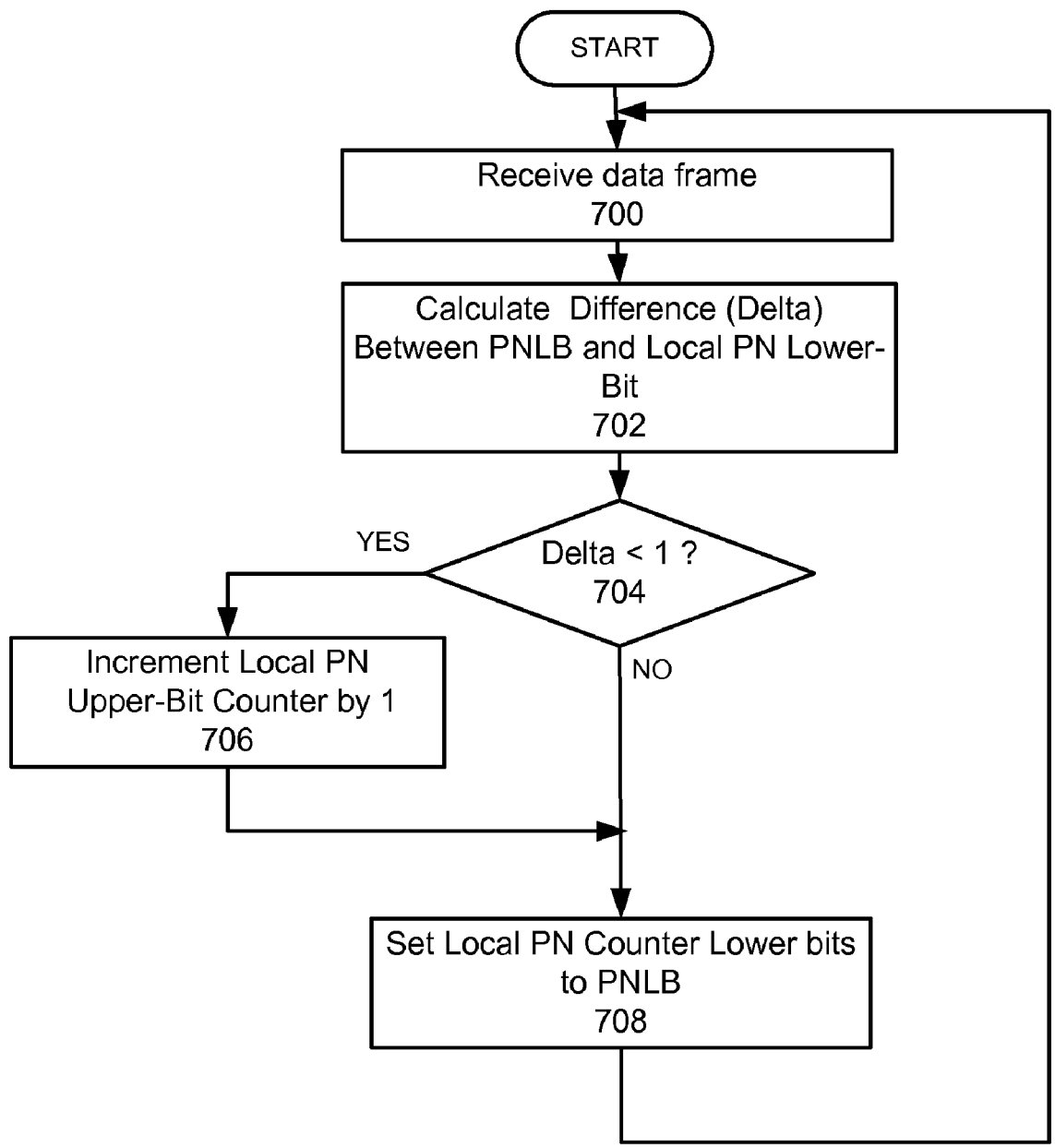
FIG. 7 presents a flow chart illustrating the process of synchronizing a local PN counter with a remote PN counter in accordance with an embodiment of the present invention.

FIG. 7 presents a flow chart illustrating the process of synchronizing a local PN counter with a remote PN counter in accordance with an embodiment of the present invention. During operation, the system receives a data frame along with its preamble (operation 700) and calculates the difference (delta) between the received PNLB field and the value of the lower bits of a local PN counter (operation 702). The system then determines whether delta is less than 1 (operation 704), and if so, the system determines that there is a carry-over from the lower bits; as a result, the system increments the upper-bit of the local counter (operation 706). Otherwise, the upper-bit of the local counter stays unchanged. The system then sets the lower-bit of the local counter to the received PNLB field (operation 708), thus synchronizing the local PN counter with the remote PN counter.

Figure 8A:
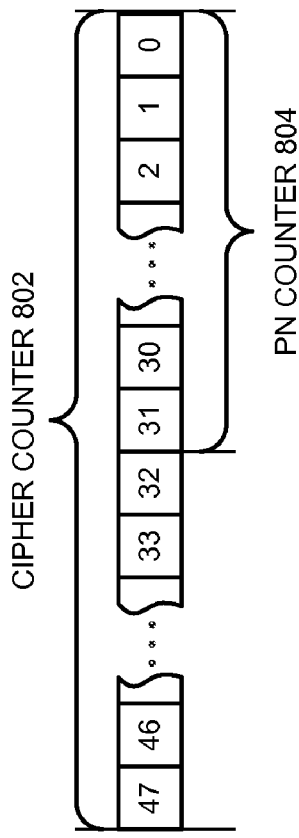
FIG. 8A presents a diagram illustrating a 48-bit cipher counter based on the 32-bit PN in accordance with an embodiment of the present invention.

FIG. 8A presents a diagram illustrating a 48-bit cipher counter based on the 32-bit PN in accordance with an embodiment of the present invention. The 32 LSBs (bit 0 to bit 31) of a cipher counter 802 are identical to a PN counter 804. The remaining 16 most significant bits (MSBs) of cipher counter 802 can be a known constant.

A 7-bit block counter (not shown in FIG. 8A) is responsible for counting the number of 128-bit blocks within a data frame. The block counter is reset to zero at the beginning of each frame and is incremented by 1 for each 128-bit block.

Figure 8B:
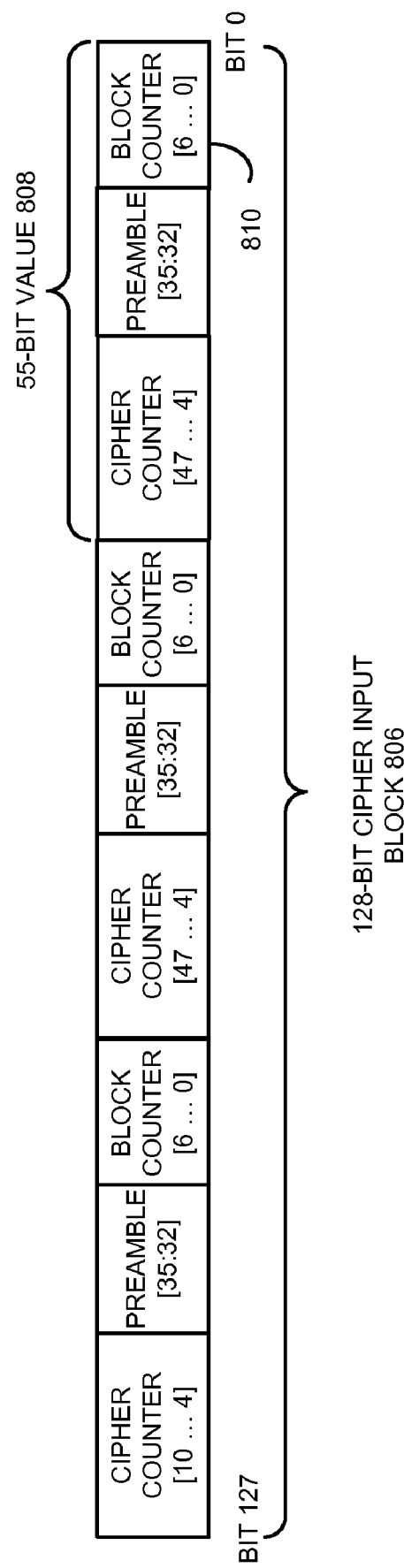
FIG. 8B illustrates the composition of an exemplary 128-bit cipher input block in accordance with one embodiment of the present invention.

FIG. 8B presents a diagram illustrating the composition of an exemplary 128-bit cipher input block in accordance with one embodiment of the present invention. A 128-bit cipher input block 806 is constructed by duplicating and concatenating a 55-bit value 808 three times, and discarding the most significant 37 bits of the resulting 165-bit value. The 55-bit value is obtained by concatenating the 44 MSBs of 48-bit cipher counter 802 with the 4-bit PNLB field 504 (bit 32 to bit 35) of the EPON frame preamble and a 7-bit block counter 810. Note that in addition to the one shown in FIG. 8B, it is also possible to construct a 128-bit cipher input block differently based on the PN number, as long as the resulting input block does not repeat itself for the same session key.

MPCP Cipher Counter

In addition to PN, it is also possible to construct a cipher counter based on the value of a multi-point-control-protocol (MPCP) counter. According to IEEE standard 802.3, to avoid collision, EPON implements an MPCP for scheduling the ONUs' transmissions. The MPCP constitutes an absolute timing model, in which a global clock exists in the OLT, and the ONUs set their local clock to the OLT clock during initialization. All control messages, such as MPCP GATE and REPORT messages, are time-stamped with the local clock, and through those time stamps the devices are able to synchronize their clocks. Note that MPCP REPORT messages are used by the ONU to tell the OLT the amount of packets in its buffer to be sent, and the MPCP GATE message is used by the OLT to grant a time slot for the ONU to transmit. The MPCP time is recorded as a 32-bit integer, which indicates the value of a counter. The value of the MPCP counter increments every 16 ns as defined in IEEE standard 802.3.

Ideally, the propagation delay between the OLT and the ONU remains constant, and the MPCP counter at the OLT and the MPCP counter at the ONU are aligned. That is, if a frame is transmitted by the OLT when its MPCP counter reaches N, this frame will be received by the ONU when the ONU's MPCP counter also reaches N. However, according to IEEE standard 802.3, the amount of time stamp jitter can be as high as 8 TQ (128 ns) in the downstream (OLT to ONU) direction and 12 TQ (192 ns) for a round-trip (OLT to ONU to OLT) transmission. Such a time jitter is due to the difference between the physical layer clock and the MAC control clock. As a result, there is a slight difference of the MPCP time between the OLT and the ONU. Such a difference is often reflected as the misalignment of the lower bits of the MPCP counters. To build a synchronized cipher input block using the MPCP time, one approach is to truncate the misaligned lower bits of the MPCP counters, thus eliminating the MPCP time stamp jitter. Typically, the last 5 bits of the MPCP counter are truncated to allow 32 TQ (512 ns) of variability.

Figure 9A:
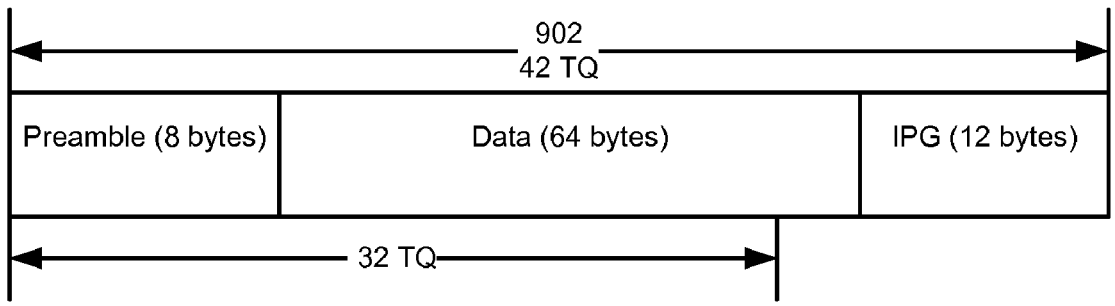
FIG. 9A present a diagram illustrating a minimum size 1 G EPON data frame in comparison with 32 time quanta (TQ).
Figure 9B:
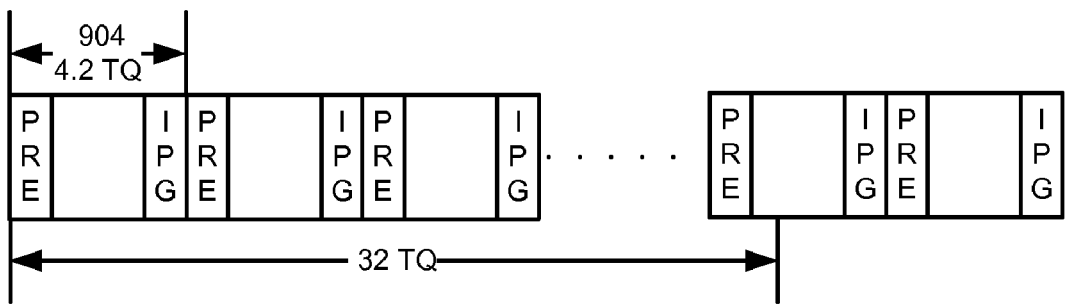
FIG. 9B presents a diagram illustrating a series of minimum size 10 G EPON data frames in comparison with 32 TQ.

Such an approach works perfectly for a 1-Gigabit (1 G) EPON, where a minimum size packet lasts longer than 512 ns. As a result, the truncated MPCP counter is guaranteed to increment within a packet length, thus preventing the encryption scheme to from reusing the same cipher counter value for the same key. FIG. 9A presents a diagram illustrating a minimum size 1 G EPON data frame in comparison with 32 TQ. A minimum size EPON packet 902 is 84 bytes long, which includes 64 bytes of data, 8 bytes of preamble, and 12 bytes of inter-packet gap (IPG). For a 1 G EPON, 84 bytes last 42 TQ (672 ns). FIG. 9B presents a diagram illustrating a series of minimum size 10 G EPON data frames in comparison with 32 TQ. Note that in a 10 G EPON, the MPCP time operates on the same TQ (16 ns) as the 1 G EPON. As a result, a minimum size 10 G EPON packet 904 lasts only 4.2 TQ, and a 32-TQ time span can include more than one packet. Consequently, the more than one packet within the same 32-TQ time span may use the same cipher counter value for encryption, thus degrading the level of security.

To resolve the TQ uncertainty of the truncated MPCP cipher counter, an embodiment of the present invention includes lower bits of the MPCP counter when constructing a cipher input block. Because of the time jitter, these MPCP counter lower bits need to be transferred along with the encrypted data frame. To avoid frame overhead, in one embodiment, four lower bits (bit 2 to bit 5) of the MPCP counter are sent as part of the EPON frame preamble.

Figure 10A:
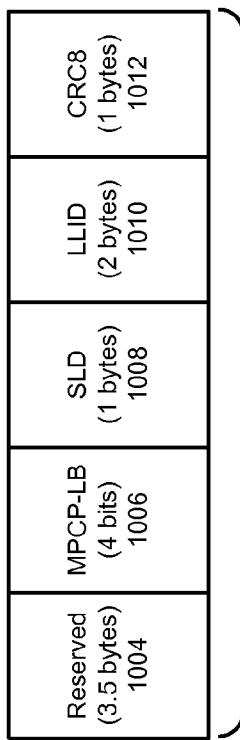
FIG. 10A presents a diagram illustrating a modified EPON frame preamble in accordance with an embodiment of the present invention.
Figure 10B:
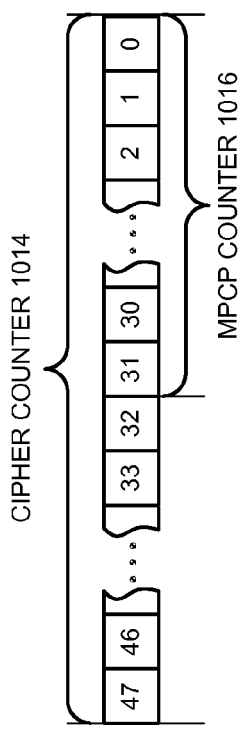
FIG. 10B presents a diagram illustrating a 48-bit cipher counter based on an MPCP counter in accordance with an embodiment of the present invention.

FIG. 10A presents a diagram illustrating a modified EPON frame preamble in accordance with an embodiment of the present invention. EPON frame preamble 1002 includes a three-and-half-byte reserved field 1004, a four-bit MPCP lower bits (MPCP-LB) field 1006, a one-byte SLD field 1008, a two-byte LLID field 1010, and a one-byte CRC8 field 1012. MPCP-LB field 1006 includes bit 2 to bit 5 of the MPCP counter of the transmitting station. By sending MPCP counter lower bits (bit 2 to bit 5) along with the encrypted data frame, the system can increase the time resolution of a cipher input block to 4 TQ (64 ns), which is less than the length of a 10 G minimum size EPON packet, thus preventing the reuse of the cipher input block FIG. 10B presents a diagram illustrating a 48-bit cipher counter based on the MPCP counter in accordance with an embodiment of the present invention. The 32 LSBs (bit 0 to bit 31) of a cipher counter 1014 are identical to a MPCP counter 1016. The remaining 16 most significant bits (MSBs) of cipher counter 1014 can be a known constant. A 7-bit block counter (not shown in FIG. 10B) is responsible for counting the number of 128-bit blocks within a data frame. The block counter is reset to zero at the beginning of each frame and is incremented by 1 for each 128-bit block.

Figure 10C:
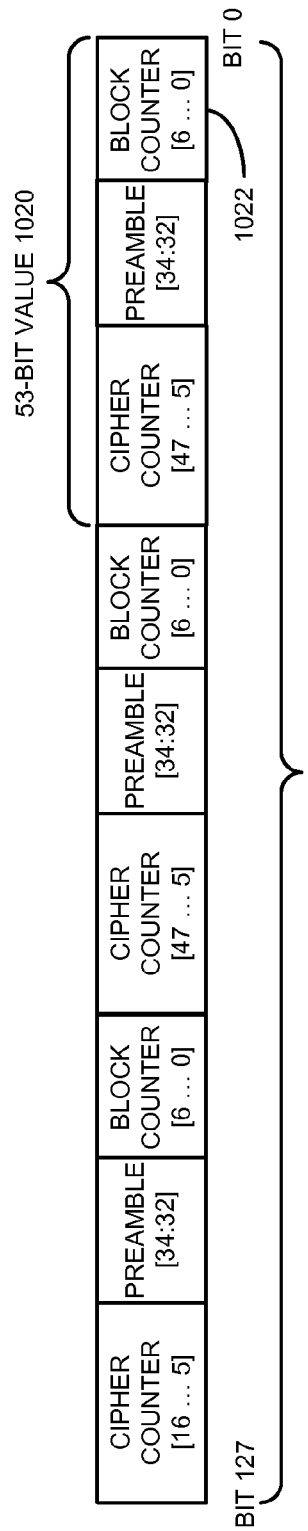
FIG. 10C presents a diagram illustrating the composition of an exemplary 128-bit input block in accordance with one embodiment of the present invention.

FIG. 10C presents a diagram illustrating the composition of an exemplary 128-bit input block in accordance with one embodiment of the present invention. A 128-bit cipher input block 1018 is constructed by duplicating and concatenating a 53-bit value 1020 three times, and discarding the most significant 31 bits of the resulting 159-bit value. The 53-bit value is obtained by concatenating the 43 MSBs of 48-bit cipher counter 1016 with the 3 lower bits of the 4-bit MPCP-LB field 1006 (bit 32 to bit 34) of the EPON frame preamble and a 7-bit block counter 1022.

Note that the 43-bit truncated cipher counter is updated every 512 ns at both the OLT and the ONU. However, it is still possible for the 43 MSBs of the cipher counters in the transmitting and receiving stations to become misaligned. For example, a carry-over from bit 4 to bit 5 may occur in the 48-bit cipher counter at the receiving station because of the propagation delay variation. As a result, the 43-bit truncated cipher counters of the transmitting and receiving stations can become misaligned. To ensure that the cipher counters are properly aligned, one embodiment of the present invention updates the local cipher counter based on the transferred MPCP lower bits in the preamble.

A receiving station ideally notes the value of its local cipher counter corresponding to the first byte of a received data frame. By comparing the most significant bit (MSB) of MPCP-LB field 1006 (received bit 5 of the MPCP counter of the transmitting station) in the frame preamble with bit 5 of the local cipher counter, the local cipher counter can be adjusted. This can be done by incrementing or decrementing the local cipher counter value until bit 5 of the counter is equal to the received bit 5. The decision as to whether to increment or decrement the counter is based on which direction will result in a smaller absolute change. Since the maximum delay variation allowed by the IEEE standard 802.3 is less than half of the update period for bit 5, only one direction for adjustment is possible.

Table 1 illustrates a pseudo code for adjusting the local cipher counter based on the MSB of the received MPCP-LB field in accordance with an embodiment of the present invention. Here cipher_bit5 denotes the received bit 5 of the cipher counter, and cipher_counter[0:4] denotes the 5 least significant bits of the local cipher counter. When the received value of bit 5 is different from the local value, and if the value of the lower 5 bits of the cipher counter is greater than or equal to $2^4$ (half of the maximum value represented by 5 binary digits), the cipher counter is incremented until its bit 5 changes. This can be done by, for example, adding to the cipher counter an inversion of its lower 5 bits, and then adding 1 to it. This ensures that a carry-over from bit 4 to bit 5 occurs.

Similarly, if the value of the lower 5 bits of the cipher counter is less than $2^4$, the cipher counter is decremented until its bit 5 changes. This can be done by subtracting from the cipher counter the value of its lower 4 bits, and then further subtracting 1 from it.

TABLE 1

```
if( cipher_counter[5] != cipher_bit5 )
{
    if( cipher_counter[0:4] >= 16 )
        // increment the cipher_counter to the nearest
// future value so that
        // cipher_counter[5] == cipher_bit5
        cipher_counter = cipher_counter +
        ~cipher_counter[0:4] + 1;
    else
        // decrement the cipher_counter to the nearest
// past value so that
        // cipher_counter[5] == cipher_bit5
        cipher_counter = cipher_counter -
        cipher_counter[0:4] - 1;
}
```

Note that when constructing a cipher counter, in addition to truncating the 5 LSBs of the local MPCP time and transferring 4 lowers bits including bit 2 to bit 5 of the remote MPCP time, other combinations are also possible. For example, in one embodiment, 8 LSBs of the local MPCP time are truncated, and 8 LSBs of the remote MPCP time are transferred in the frame preamble. Also note that the composition of 128-bit cipher input block 1018 shown in FIG. 10C is just an example, and other ways to construct 128-bit cipher input block 1018 are also possible, as long as it is based on a truncated MPCP counter, a field in the frame preamble that includes lower bits of the remote MPCP time, and a block counter counting the number of 128 bit blocks within the data frame.

Downstream Encryption

In one embodiment of the present invention, an OLT needs only one cipher counter for encrypting downstream frames. The initial value of the OLT's cipher counter is conveyed to an ONU during the initial key exchange procedure (described below).

One advantage of the encryption scheme provided herein is that it does not result in undesirable frame chaining. Frame chaining occurs when a lost or corrupted frame can inhibit proper decryption of all subsequent frames. Based on an embodiment of the present invention, each frame is independently encrypted and decrypted based either on its PN or on the time of the frame's departure and arrival. The departure and arrival times correspond to the time of transmission of the first octet of the frame (first octet of the destination address field).

For unicast logical links, the key exchange request can be initiated by the OLT and a new key is generated by the ONU. In the case of multicast logical links, the OLT initiates key exchange and generates the new key value.

Optional Upstream Encryption

In the upstream direction, the cipher counters are not aligned as they are in the downstream direction. To encrypt upstream frames, an ONU uses the value of its cipher counter corresponding to the starting time for its granted transmission slot assigned by the OLT. The first block of the first frame in a slot would be associated with the cipher counter value corresponding to the starting time of the slot. Starting at the time when the first byte of the first frame is transmitted, the cipher counter will continue to increment itself every 16 ns.

Figure 11:
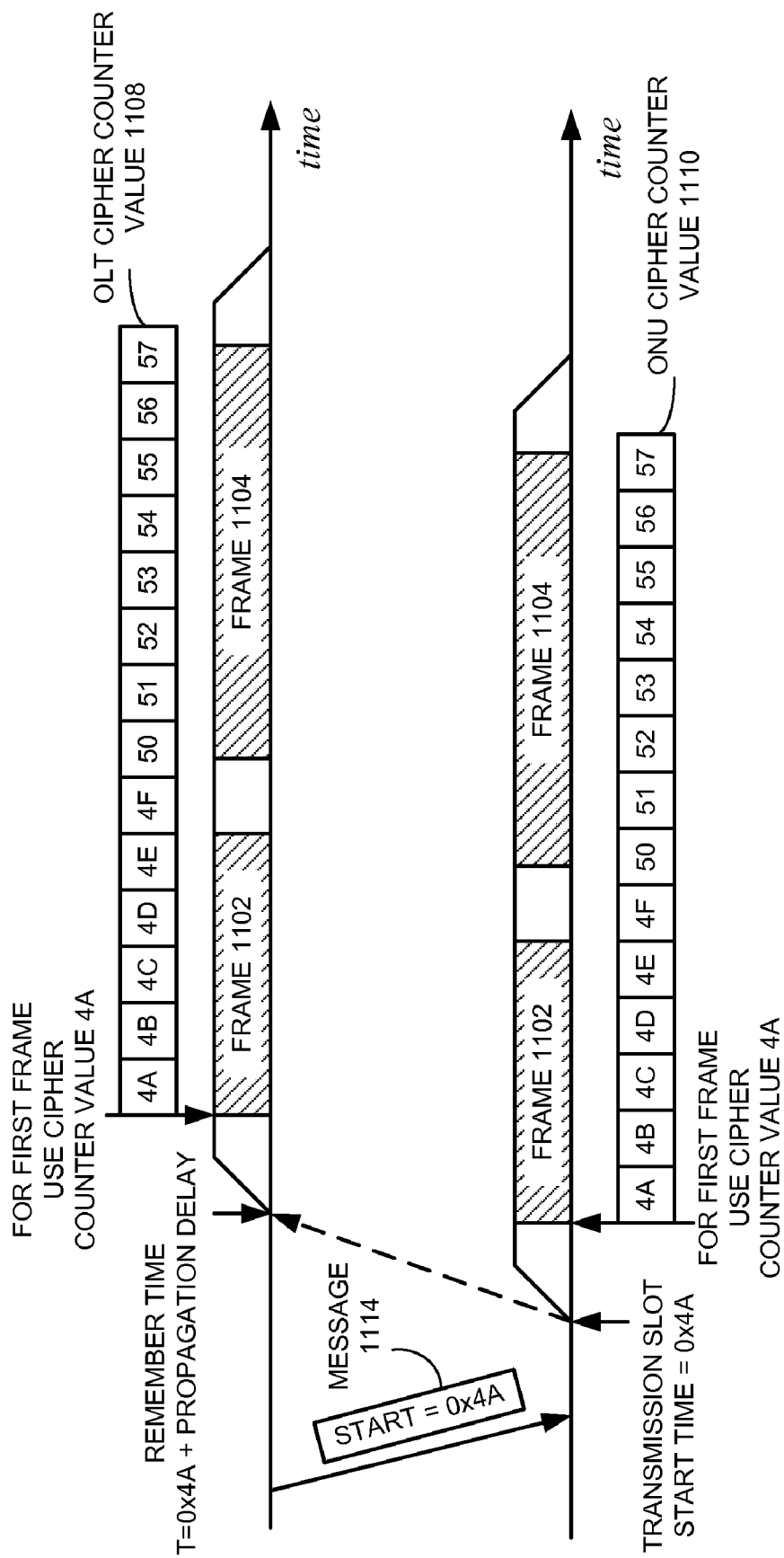
FIG. 11 illustrates the process of aligning an ONU-side cipher counter with an OLT-side cipher counter for upstream encryption in accordance with one embodiment of the present invention.

To decrypt the received frames, the OLT ideally remembers the future time when the granted transmission slot will commence for the ONU. The first frame arriving after this time will be decrypted with the cipher counter value associated with the remembered future time FIG. 11 illustrates the process of aligning an ONU-side cipher counter with an OLT-side cipher counter for upstream encryption in accordance with one embodiment of the present invention. During operation, an OLT sends a grant message 1114 to an ONU. Message 1114 assigns the ONU an upstream transmission slot, whose starting time is 0x4A (hexadecimal value). Because the ONU's clock is synchronized to the OLT's clock, the receiving time of message 1114 at the ONU is ideally the same as the transmitting time at the OLT.

At local time 0x4A, the ONU starts transmitting the first frame 1102 within the assigned transmission slot. Before transmitting frame 1102, the ONU properly sets its cipher counter 1110 based on the granted starting time, which is 4A. In addition, the ONU includes in the frame preamble of frame 1102 bit 2 to bit 5 of the granted starting time. Correspondingly, the beginning value of cipher counter 1110 associated with the first 128-bit block of frame 1102 is set to 4A. On the OLT side, the OLT expects to receive frame 1102 at time T, where T is the starting time 0x4A plus the round-trip delay from the ONU to the OLT. (The OLT logs each ONU's round-trip delay.) The OLT then sets its cipher counter 1108 to 4A at time T. In this way, the OLT's cipher counter can be synchronized with that of the ONU. Similarly, the cipher counters on both the OLT and the ONU can remain synchronized for frame 1104.

The actual procedure for the upstream encryption function is similar to that of the downstream encryption. For unicast logical links, a key exchange request is initiated by the OLT and a new key is generated by an ONU. In case of multicast logical links, the OLT initiates key exchange and generates the new key value.

Key Exchange Mechanism

Key exchange messages can be carried in operation, administration, and management (OA&M) frames. FIG. 12 presents a diagram illustrating an exemplary format of a key exchange message in accordance with one embodiment of the present invention. The fields of a key exchange message are explained below:

DA—Destination MAC address as defined in the IEEE 802.3 standard, clause 3.2.4.

SA—Source MAC address as defined in the IEEE 802.3 standard, clause 3.2.5.

Length/type—This field identifies the length or type of a frame as defined in the IEEE 802.3 standard, clause 3.2.6. According to the IEEE 802.3 standard, OAM messages are identified by Slow Protocol type (88-09).

Subtype—This field identifies the specific Slow Protocol being encapsulated. OAM protocol data units (OAMPDUs) carry the Subtype value 0x03 as defined in the IEEE 802.3 standard.

flags—This field contains status bits as defined in the IEEE 802.3 standard clause 57.4.2.1.

code—This field identifies the specific OAMPDU. For vendor-specific OAMPDUs this field should be assigned value 0xFE as defined in the IEEE 802.3 standard clause 57.4.2.2.

OUI—The first three octets of the Organization Specific OAMPDU Data field shall contain the Organizationally Unique Identifier (OUI). Implementations compliant with this specification ideally uses a locally administered OUI=FF-FF-FF. Note that the fields described above are also specified in the IEEE 802.3 standards.

message_type—This field identifies a specific kind of message under the same OUI group. The format of the PDU following the message type field is dependent on the message type. message_type specifies three types of key exchange messages:

0x01 (KEY_REQUEST): This message is issued by the OLT to request a new key from an ONU. It also conveys to the ONU a future frame counter value at which a key switch-over may take place. (Note that a key switch-over is the event when an OLT or ONU changes its session key.)

0x02 (KEY_ASSIGN): This message is issued by the OLT to assign a new key to an ONU. It also conveys a future frame counter value at which a key switch-over should take place. Typically, an ONU generates a new key on the OLT's request. However, in some circumstances, the OLT may generate a key. One such example is a key exchange for multicast channels, wherein all receiving devices use the same key. Note that if a multicast-capable OAM extension exists, a single copy of this message may be sent to each ONU; otherwise, an individual message is sent to each ONU.

0x03 (KEY_RESPONSE): This message is issued by an ONU in response to KEY_REQUEST or KEY_ASSIGN message. In this message, an ONU conveys to the OLT the new key value to be used after the switch-over and also confirms the key switch-over counter value.

options—This field lists special requirements of key exchange. If bit 0 of this field is 0, it indicates a downstream key exchange. If bit 0 of this field is 1, it indicates an upstream key exchange. Bits 1 to 15 are reserved.

cipher_counter—This field contains the 16 most significant bits of the cipher counter corresponding to the first block of the key exchange message. Although a cipher counter is 48 bits long, the actual transmitted cipher counter from a transmitting station to a receiving station does not need to contain all 48 bits. This is because the lower 32 bits are identical to an MPCP counter, which is typically synchronized between the transmitting station and the receiving station. A full-length, 48-bit cipher counter is updated every 16 ns. In contrast, the higher 16-bit portion of the cipher counter is updated much less frequently. Therefore, transmitting only the higher 16 bits can significantly reduce the burden on the control mechanism.

switch_counter—This field represents the value of the cipher counter at which a given key should become active. It is important that the new key becomes active in the OLT and an ONU synchronously with transmission and reception of the same message.

key—This field carries a 128-bit value representing the encryption key.

pad—Additional redundant bits to pad up the frame.

FCS—This is the Frame Check Sequence.

In a downstream key exchange, the OLT initiates the key exchange procedure by generating a KEY_REQUEST message. The switch_counter field carries the frame number corresponding to the first frame to use the new key value. The value of cipher_counter is set to the 16 most significant bits of the OLT's own cipher counter corresponding to the first block of the KEY_REQUEST message. The options field has its bit 0 set to 0. Simultaneously with sending the KEY_REQUEST message, the OLT starts a key exchange timer.

Upon receiving the KEY_REQUEST message, the ONU loads its cipher counter with a combination of the received 16 most significant bits of the OLT's cipher counter, and its local MPCP counter. The ONU then stores the received switch_counter value. Next, it generates and stores a new key and responds to the OLT by transmitting a KEY_RESPONSE message in which it conveys the new key to the OLT. The switch_counter field of the KEY_RESPONSE message carries a copy of the received switch_counter value. The key field contains a new 128-bit value to be used as a new key. The cipher_counter field is set to the 16 most significant bits of the ONU's own cipher counter corresponding to the first block of the KEY_RESPONSE message. The options field has its bit 0 set to value 0 and bit 1 set to value 1.

A successful reception of the KEY_RESPONSE message concludes the key exchange procedure. If no KEY_RESPONSE message arrives before the key exchange timer expires, or if the returned value of switch_counter does not correspond to the value set in the KEY_REQUEST message, the OLT will initiate another key exchange procedure by issuing a new KEY_REQUEST message. When a new KEY_REQUEST message arrives, the ONU may discard any stored keys it may have generated previously and generate a new key. Ideally, the ONU uses the most-recently received switch_counter value and the most-recently generated key. Furthermore, the OLT may initiate a key exchange procedure well in advance of the intended key switch-over time. This ensures that the key exchange can be repeated several times.

An upstream key exchange procedure is similar to a downstream key exchange procedure, with the exception that bit 0 of the option field has a value of 1 in both KEY_REQUEST and KEY_RESPONSE messages. If upstream encryption is desired, the initial key exchange procedure for the upstream channel is ideally performed before the key exchange for the downstream channel.

Maintaining States of Cipher Counters for Multiple ONUs

One way for an OLT to keep track of the states of cipher counters for the ONUs is to implement a separate cipher counter for each ONU. However, this approach requires a large number of gates. A chip's limited die area would affect the scalability of an EPON implementing this approach. Furthermore, each cipher counter needs to be reset at the start of an encryption session and when an encryption key is changed. Another challenge associated with this approach is that when the MPCP counter rolls over, each cipher counter needs to be updated simultaneously. Therefore, synchronization of all the cipher counters within the OLT is difficult to control.

One embodiment of the present invention alleviates the aforementioned problems by implementing only one counter, namely a cycle counter. To track the states of cipher counters corresponding to different ONUs, the OLT provides a number of registers for each ONU. By using these registers, the OLT can keep track of the offset between each ONU's cipher counter and the cycle counter which is continuously updated. In this way, the OLT can avoid updating many cipher counters independently.

In one embodiment, the OLT provides a register for each ONU (or each LLID). Whenever a cipher counter is reset, the OLT writes the value of the current cycle counter into the register. During an encryption process, the value of a given ONU's cipher counter is re-created by subtracting the value of the corresponding register from the current value of the cycle counter. In this way, the OLT only needs to increment a single counter when the MPCP counter rolls over. Consequently, the complexity of the hardware implementation can be significantly reduced. Note that the register does not need to be incremented continuously. Instead, it is updated only when the corresponding cipher counter needs to be reset.

Computer System

Figure 13:
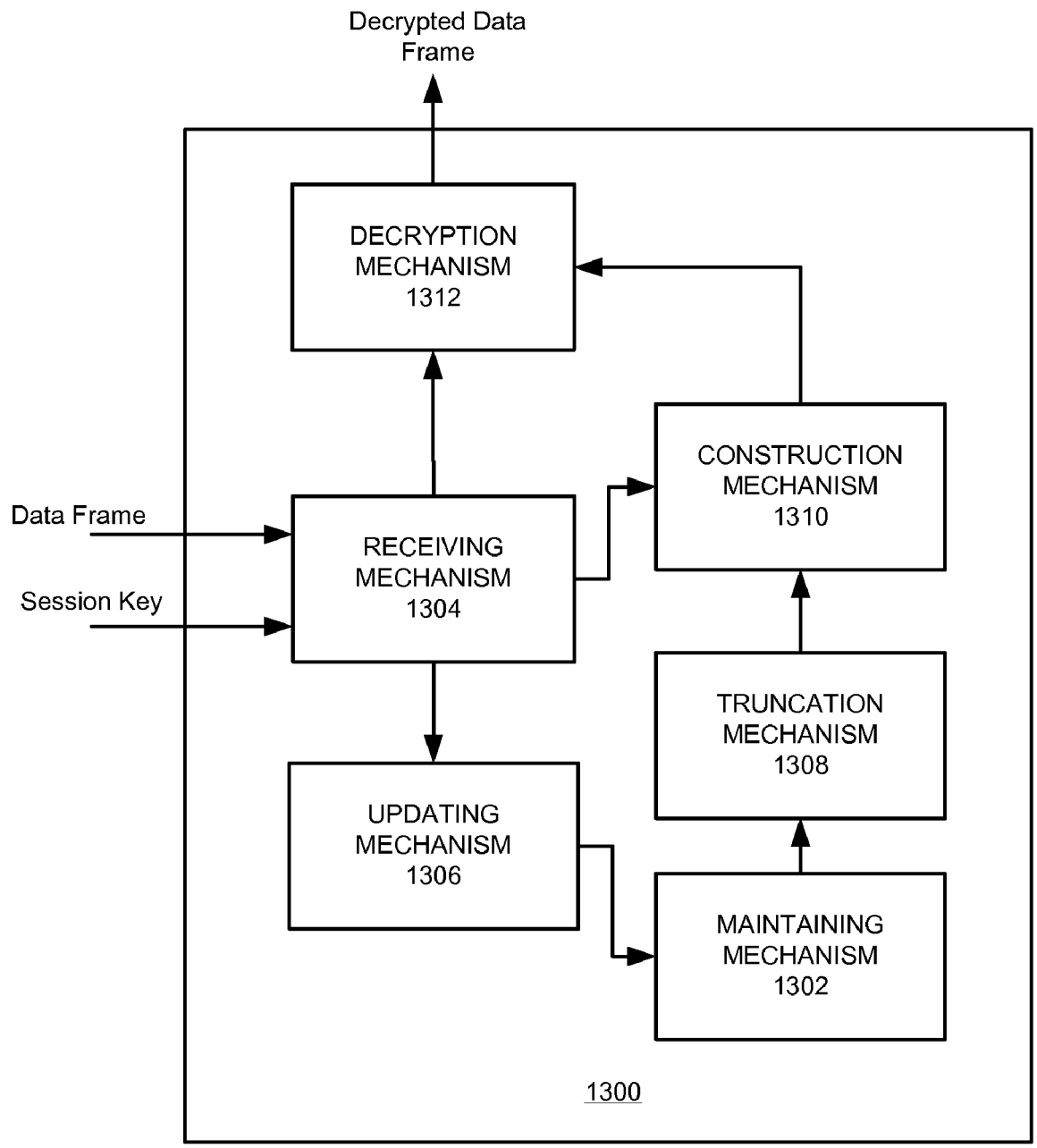
FIG. 13 presents a diagram illustrating an exemplary system for decrypting data frame in an EPON in accordance with an embodiment of the present invention.

FIG. 13 presents a diagram illustrating an exemplary system for decrypting a data frame in an EPON in accordance with an embodiment of the present invention. Data frame decrypting system 1300 includes a maintaining mechanism 1302, a receiving mechanism 1304, an updating mechanism 1306, a truncation mechanism 1308, a construction mechanism 1310, and a decryption mechanism 1312. During operation, maintaining mechanism 1302 maintains a local cipher counter; receiving mechanism 1304 receives a data frame and a session key; and updating mechanism 1306 updates the local cipher counter based on a field in the frame preamble of the received data frame. Truncation mechanism 1308 truncates the local cipher, and construction mechanism 1310 constructs a cipher input block based on the truncated cipher counter, a field in the received frame preamble, and a block counter. Decryption mechanism 1312 decrypts the data frame using the cipher input block and the session key.

Figure 14:
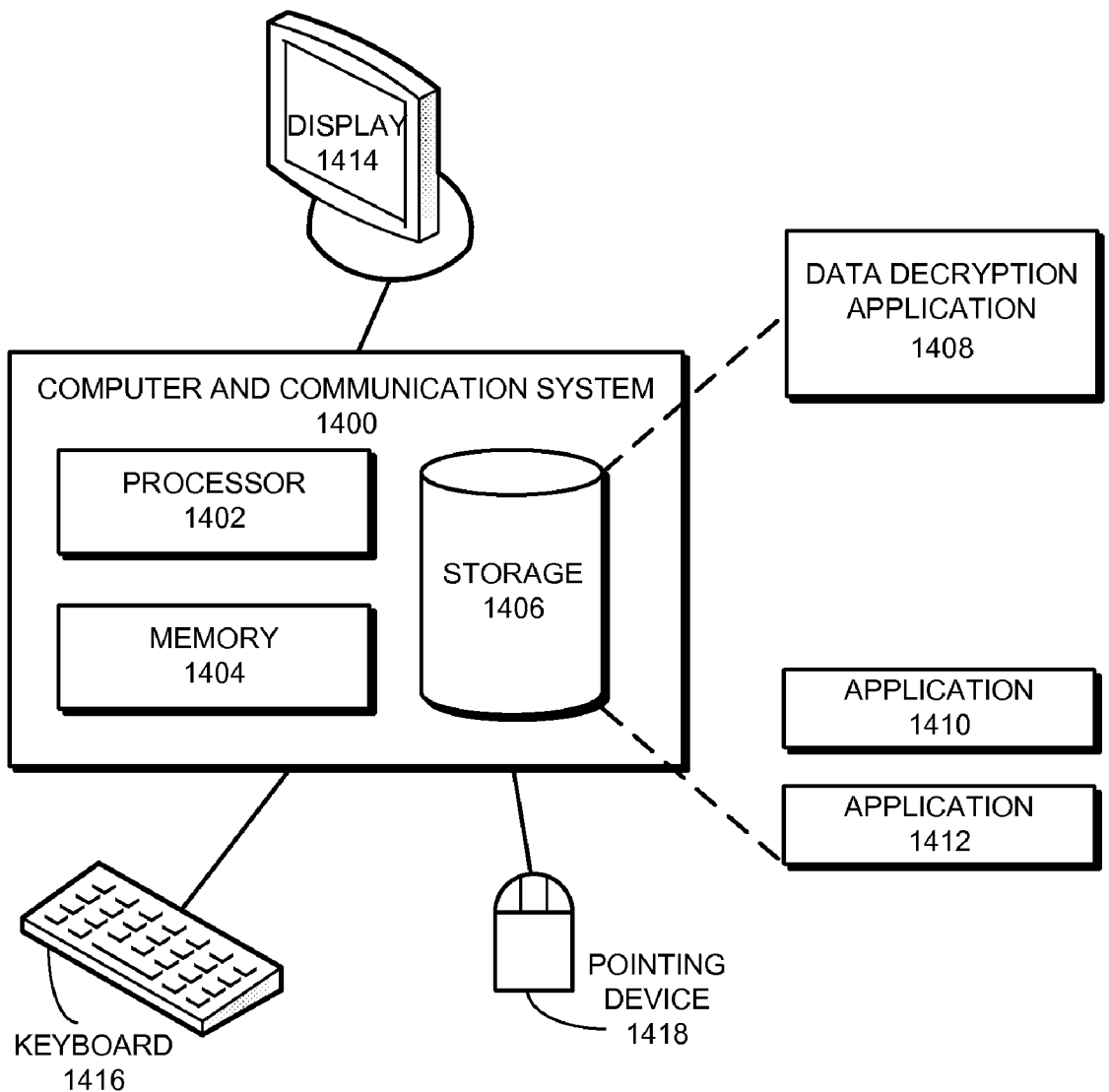
FIG. 14 presents a diagram illustrating an exemplary computer system for decrypting a data frame in an EPON in accordance with an embodiment of the present invention.

FIG. 14 presents a diagram illustrating an exemplary computer system for decrypting a data frame in an EPON in accordance with an embodiment of the present invention. In one embodiment, a computer and communication system 1400 includes a processor 1402, a memory 1404, and a storage device 1406. Storage device 1406 stores an data decryption application 1408, as well as other applications, such as applications 1410 and 1412. During operation, data decryption application 1408 is loaded from storage device 1406 into memory 1404 and then executed by processor 1402. While executing the program, processor 1402 performs the aforementioned functions. Computer and communication system 1400 is coupled to an optional display 1414, keyboard 1416, and pointing device 1418.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for decrypting data frames in an Ethernet passive optical network (EPON), comprising:
    receiving a data frame encrypted based on a remote input block and a session key, wherein the remote input block is constructed based on a remote cipher counter;
    updating a local cipher counter based on a portion of the remote cipher counter represented by at least two bits and located in a field, other than a checksum field, in a preamble of the data frame;
    truncating the local cipher counter by discarding a number of least significant bits;
    constructing for the received data frame a local input block based on the truncated local cipher counter and the portion of the remote cipher counter; and
    decrypting the data frame based on the local input block and the session key.

2. The method of claim 1, wherein the remote cipher counter is a remote packet number (PN) counte, and wherein the local cipher counter is a local PN counter.

3. The method of claim 2, wherein the portion of the remote cipher counter includes n least significant bits of the remote cipher counter.

4. The method of claim 3, wherein truncating the local cipher counter further comprises:
    truncating the local cipher counter by discarding n least significant bits.

5. The method of claim 3, wherein updating the local cipher counter further comprises:
    updating the local cipher counter based on a difference between the portion of the remote cipher counter and the n least significant bits of the local cipher counter.

6. The method of claim 3, wherein updating the local cipher counter further comprises:
    incrementing the local cipher counter if a difference between the portion of the remote cipher counter and the n least significant bits of the local cipher counter is less than one.

7. The method of claim 1, wherein the remote cipher counter is a remote multi-point control protocol (MPCP) counter, and wherein the local cipher counter is a local MPCP counter.

8. The method of claim 7, wherein the portion of the remote cipher counter includes bit i to bit j of the remote MPCP counter, and wherein i is greater than zero.

9. The method of claim 8, wherein truncating the local cipher counter further comprises:
    truncating the local cipher counter is truncated by discarding j least significant bits.

10. The method of claim 8, wherein updating the local cipher counter further comprises:
    incrementing the local cipher counter until bit j of the local cipher counter is equal to the most significant bit of the portion of the remote cipher counter if the decimal value of the least significant j bits of the local cipher counter is greater than or equal to $2^{(j-1)}$; and
    decrementing the local cipher counter until bit j of local cipher counter is equal to the most significant bit of the portion of the remote cipher counter if the decimal value of the least significant j bits of the local cipher counter is less than $2^{(j-1)}$.

11. The method of claim 8, wherein i equals 2 and j equals 5.

12. The method of claim 1, wherein constructing for the received data frame the local input block further comprises:
    concatenating the truncated local cipher counter and the portion of the remote cipher counter.

13. The method of claim 1, wherein decrypting the received data frame comprises:
    encrypting the constructed local input block with the session key based on the Advanced Encryption Standard (AES) to obtain a local output block; and
    performing an exclusive OR (XOR) operation on a block of data within the received data frame and the local output block to obtain a block of unencrypted data.

14. A non-transitory computer-readable storage medium storing instructions that when executed by a computer cause the computer to perform a method for decrypting data frames in an Ethernet passive optical network (EPON), the method comprising:
    receiving a data frame encrypted based on a remote input block and a session key, wherein the remote input block is constructed based on a remote cipher counter;
    updating a local cipher counter based on a portion of the remote cipher counter represented by at least two bits and located in a field, other than a checksum field, in a preamble of the data frame;
    truncating the local cipher counter by discarding a number of least significant bits;

constructing for the received data frame a local input block based on the truncated local cipher counter and the portion of the remote cipher counter; and decrypting the data frame based on the local input block and the session key.

15. A system for decrypting data frames in an Ethernet passive optical network (EPON), comprising:
a receiver configured to receive a data frame encrypted based on a remote input block and a session key, wherein the remote input block is constructed based on a remote cipher counter; and
a processor configured to:
update a local cipher counter based on a portion of the remote cipher counter represented by at least two bits and located in a field, other than a checksum field, in a preamble of the data frame,
truncate the local cipher counter by discarding a number of least significant bits,
construct for the received data frame a local input block based on the truncated local cipher counter and the portion of the remote cipher counter, and
decrypt the data frame based on the local input block and the session key.

16. The system of claim 15, wherein the remote cipher counter is a remote packet number (PN) counter, and wherein the local cipher counter is a local PN counter.

17. The system of claim 16, wherein the portion of the remote cipher counter includes n least significant bits of the remote cipher counter.

18. The system of claim 17, wherein the processor is further configured to truncate the local cipher counter by discarding n least significant bits.

19. The system of claim 17, wherein the processor is further configured to update the local cipher counter based on a difference between the portion of the remote cipher counter and the n least significant bits of the local cipher module.

20. The system of claim 17, wherein the processor is further configured to update the local cipher counter by incrementing the local cipher counter if a difference between the portion of the remote cipher counter and the n least significant bits of the local counter is less than one.

21. The system of claim 15, wherein the remote cipher counter a multi-point control protocol (MPCP) counter, and wherein the local cipher counter is a MPCP counter.

22. The system of claim 21, wherein the portion of the remote cipher counter includes bit i to bit j of the remote MPCP counter, and wherein i is greater than zero.

23. The system of claim 22, wherein the processor is further configured to truncate the local cipher counter by discarding j least significant bits.

24. The system of claim 22, wherein the processor is further configured to update the local cipher counter by:
incrementing the local cipher counter until bit j of the local cipher counter is equal to the most significant bit of the portion of the remote cipher counter if the decimal value of the least significant j bits of the local cipher counter is greater than or equal to $2^{(j-1)}$; and
decrementing the local cipher counter until bit j of the local cipher counter is equal to the most significant bit of the portion of the remote cipher counter if the decimal value of the least significant j bits of the local cipher counter is less than $2^{j-1}$.

25. The system of claim 22, wherein i equals 2 and j equals 5.

26. The system of claim 15, wherein the processor is further configured to construct for the received data frame the local input block by concatenating the truncated local cipher counter and the portion of the remote cipher counter.

27. The system of claim 15, wherein the processor is further configured to decrypt the received data frame by:
encrypting the constructed local input block with the session key based on the Advanced Encryption Standard (AES) to obtain a local output block; and
performing an exclusive OR (XOR) operation on a block of data within the received data frame and the local output block to obtain a block of unencrypted data.

* * * * *

UNITED STATES PATENT AND TRADEMARK OFFICE
CERTIFICATE OF CORRECTION

PATENT NO. : 8,335,316 B2
APPLICATION NO. : 12/414963
DATED : December 18, 2012
INVENTOR(S) : Hirth et al.

It is certified that error appears in the above-identified patent and that said Letters Patent is hereby corrected as shown below:

Column 15, Line 63, please replace "counte" with --counter--.

Column 16, Line 26, please replace "counter is truncated" with --counter--.

Column 18, Line 4, please replace "counter a multi-point" with --counter is a multi-point--.

Column 18, Line 23, please replace "$2^{j-1}$" with --$2^{(j-1)}$--.

Signed and Sealed this
Nineteenth Day of February, 2013

Teresa Stanek Rea
*Acting Director of the United States Patent and Trademark Office*